June 12, 1962 P. NATHANSON 3,038,187
SCOURING PADS
Filed Oct. 19, 1959
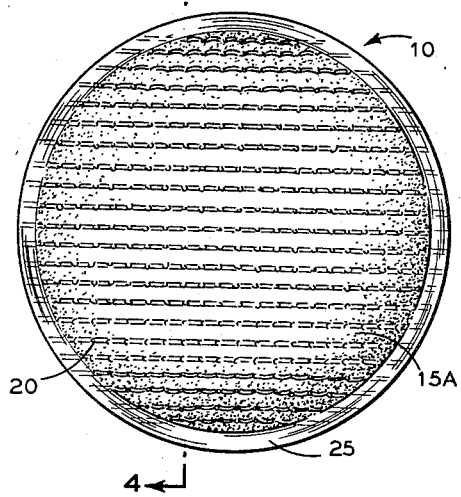
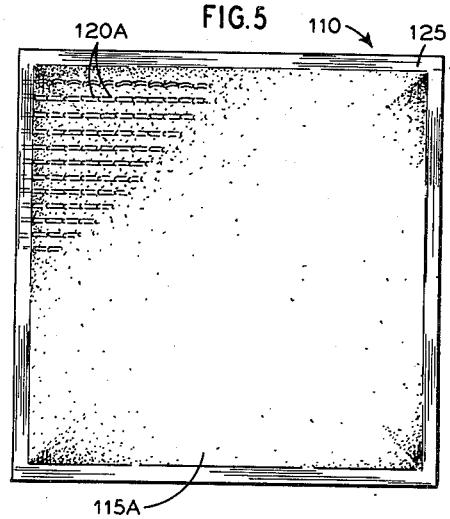
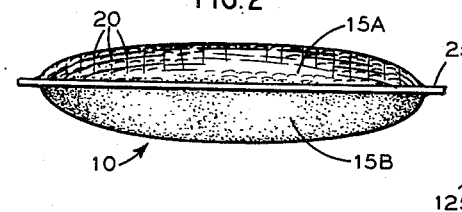
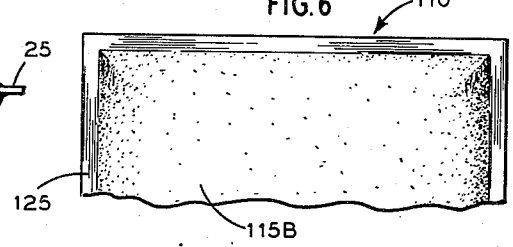
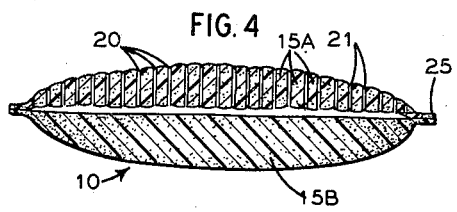
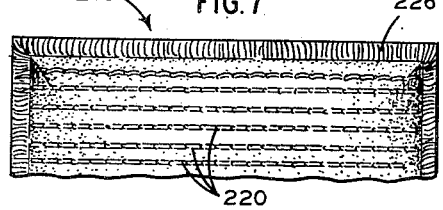
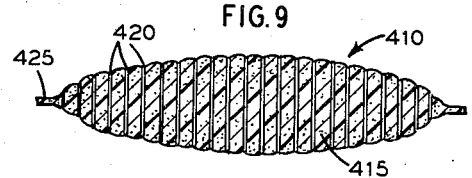
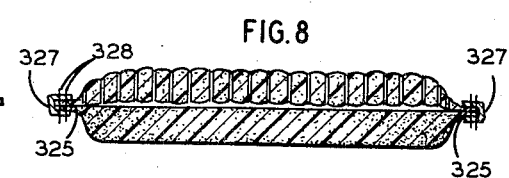
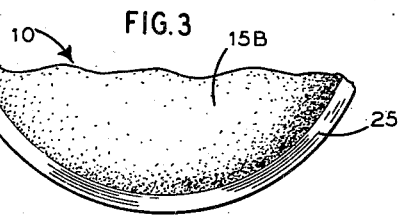
INVENTOR.
Phillip Nathanson
BY
ATTORNEY United States Patent Office 3,038,187
Patented June 12, 1962

3,038,187
SCOURING PADS
Philip Nathanson, 455 Schenectady Ave., Brooklyn, N.Y.
Filed Oct. 19, 1959, Ser. No. 847,218
6 Claims. (Cl. 15—118)

This invention relates to scouring pads and, more particularly, to such pads having the desirable grime removing properties of metallic pads while not being subject to rust and corrosion, and further having the water absorbing capacity of sponges.

Scouring pads of metal mesh, steel wool, and the like are very effective in removing dirt, grease, stains, etc. from surfaces of material. Frequently such pads are made even more efficacious by having a soap incorporated therein.

However, such pads have several disadvantageous properties, such as being subject to rust and corrosion, inability to retain any significant amount of water, likelihood to scratch surfaces, and other disadvantages. If such pads are made of corrosion-resistant metal, their cost is sufficiently high as to price them out of the mass market.

For these reasons, it has been proposed to make scouring pads of inert relatively inexpensive materials, such as synthetic resins. A known form of pad of this type is woven of plastic composition tapes or strings. While this has some efficacy as a dirt abrading pad, it is not capable of retaining any effective amount of water.

Plastic composition sponges are known, being formed of foamed material, and have good water retaining properties. However, their ability to abrade grime and stains from surfaces is very poor and of the order of that of natural sponges. Consequently, for heavy duty scouring, reliance is still placed on metal scouring pads despite their inherent disadvantages.

In accordance with the present invention, the disadvantages of the prior art are overcome and a simple, inexpensive, non-corroding scouring pad is provided having excellent water retaining properties. These results are achieved by a novel combination of wear resistant abrading plastic tape and a foamed plastic.

More particularly a sponge pad of plastic foam, such as a poly-urethane, has stitched thereon a narrow tape of relatively wear resistant and abrasive plastic, such as a polethylene terephthalate film. This tape forms parallel lines of stitching across the sponge material pad, compressing the latter along such parallel lines and forming abrading surfaces. The foam plastic pad acts to retain effective amounts of water.

In a preferred embodiment of the invention, two relatively thin and substantially congruent pads of foamed material are provided, and the tape is stitched through and along only one pad. The two pads are then superposed and their edges secured together as by heat sealing, stitching, or binding with tape. This provides a scouring pad having one abrading surface and the other surface relatively smooth.

For an understanding of the invention principles, reference is made to the following descriptions of typical embodiments thereof as illustrated in the accompanying drawings. In the drawings:

FIG. 1 is a top plan view of one form of scouring pad embodying the invention;

FIG. 2 is a side elevation view thereof;

FIG. 3 is a partial bottom plan view thereof;

FIG. 4 is a sectional view on the line 4—4 of FIG. 1;

FIGS. 5 and 6 are top and bottom plan views of a pad similar to that of FIGS. 1-4 but rectangular in plan;

FIG. 7 is a partial plan view of the pad of FIGS. 5 and 6 illustrating a different form of edge attachment;

FIG. 8 is a view similar to FIG. 4 illustrating a further form of edge binding; and FIG. 9 is a side elevation view of a different embodiment of a scouring pad.

Referring to FIGS. 1-4, the circular scouring pad 10 therein illustrated comprises two superposed pads 15A and 15B of foamed plastic material such as polyurethane. Before superposing pad 15A on pad 15B, pad 15A has a relatively narrow tape of abrasion resistant plastic material 20 stitched in substantially parallel lines 21 thereacross. Tape 20 is slit from a film of abrasion-resistant plastic material, preferably polyethylene terephthalate. This film is sold under the trade name "Mylar." Tape 20 may, for example, have a thickness of the order of 0.003" and a width of the order of $\frac{1}{32}$ inch, and is stitched flat against the surfaces of pad 15A by a sewing machine. The lines of stitching 21 provide ridges in pad 15A between the lines of stitching.

Pads 15A and 15B are then superposed and their peripheral margins are secured together as at 25. Such securing may be effected by heat sealing the margins, by stitching the margins together, or by enclosing the margins in a binding tape which may be adhered or stitched to the margins.

The pad 110 of FIGS. 5 and 6 is formed in the same manner as the pad 10, but is rectangular in form. While the lines of stitched tape 120A run parallel to a pair of opposite edges of pad 110, it will be understood that such lines may equally run diagonally of the pad.

The pads 10 and 110 have their respective margins 25 and 125 heat sealed together, which is a practical and relatively inexpensive way of sealing the edges. However, the edges may be secured together by a stitched binding, as shown at 226 in the pad 210 of FIG. 7, this pad having substantially parallel lines of stitched tape 220 on at least one outer surface.

In the pad 310 of FIG. 8, a tape 327 encloses the margins 325 and is adhered thereto or stitched as at 328.

In the alternative embodiment of FIG. 9, a double thickness pad 415 of the foamed material is used, and the stitched tape 420 extends along both surfaces of the pad. The margins 425 may be flattened by heat sealing if desired.

The scouring pad according to the invention floats, stays sweet and fresh, is rugged, has a long life, and is inexpensive. It may be used with or without scouring powder.

While specific embodiments of the invention have been shown and described in detail to illustrate the application of the invention principles, it will be understood that the invention may be embodied otherwise without departing from such principles.

What is claimed is:

1. A scouring device comprising, in combination, a first pad of foamed resilient non-metallic material having a pair of opposed substantially flat surfaces; a relatively narrow tape of abrasion resistant non-metallic material stitched to said pad to form a plurality of substantially parallel, laterally spaced stitched seams exposed upon the entire faces of said substantially flat surfaces; and a second pad of foamed resilient non-metallic material having a pair of opposed substantially flat surfaces and substantially congruent with said first pad; said pads being secured together along their peripheral margins.

2. A scouring device comprising, in combination, a first pad of foamed resilient non-metallic material having a pair of opposed substantially flat surfaces; a relatively narrow tape of polyethylene terephthalate stitched to said pad to form a plurality of substantially parallel, laterally spaced stitched seams exposed on the entire faces of said substantially flat surfaces; and a second pad of foamed resilient non-metallic material having a pair of opposed substantially flat surfaces and substantially congruent with said first pad; said pads being secured together along their peripheral margins.

3. A scouring device comprising, in combination, a first pad of polyurethane foam having a pair of opposed substantially flat surfaces; a relatively narrow tape of polyethylene terephthalate stitched to said pad to form a plurality of substantially parallel, laterally spaced stitched seams exposed on the entire faces of said substantially flat surfaces; and a second pad of polyurethane foam having a pair of opposed substantially flat surfaces and substantially congruent with said first pad; said pads being secured together along their peripheral margins.

4. A scouring device as claimed in claim 3 in which said peripheral margins are heat sealed.

5. A scouring device as claimed in claim 3 in which said peripheral margins are stitched together.

6. A scouring device as claimed in claim 3 in which said peripheral margins are enclosed in a binding tape.

References Cited in the file of this patent

UNITED STATES PATENTS

| | | |
|---|---|---|
| 2,052,337 | Alefantis | Aug. 25, 1936 |
| 2,804,728 | Politzer et al. | Sept. 3, 1957 |
| 2,875,461 | Anderson | Mar. 3, 1959 |
| 2,899,780 | Bottino | Aug. 18, 1959 |
| 2,910,710 | Corrington et al. | Nov. 3, 1959 |
| 2,942,285 | Gray | June 28, 1960 |

FOREIGN PATENTS

| | | |
|---|---|---|
| 1,189,547 | France | Mar. 23, 1959 |